Aug. 24, 1937.   C. A. SCHUMACHER   2,090,813
APPARATUS FOR THE SEPARATION OF MIXTURES OF
LIQUIDS OF DIFFERENT SPECIFIC GRAVITY
Filed March 9, 1935
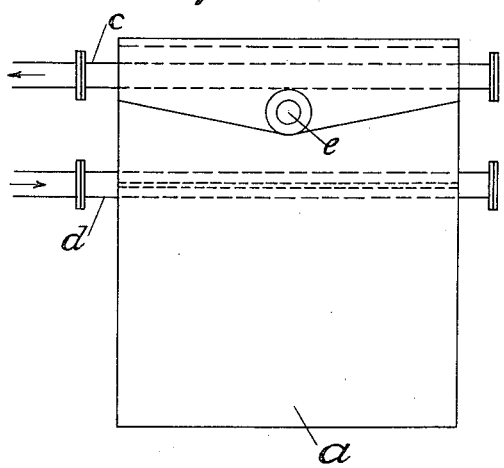
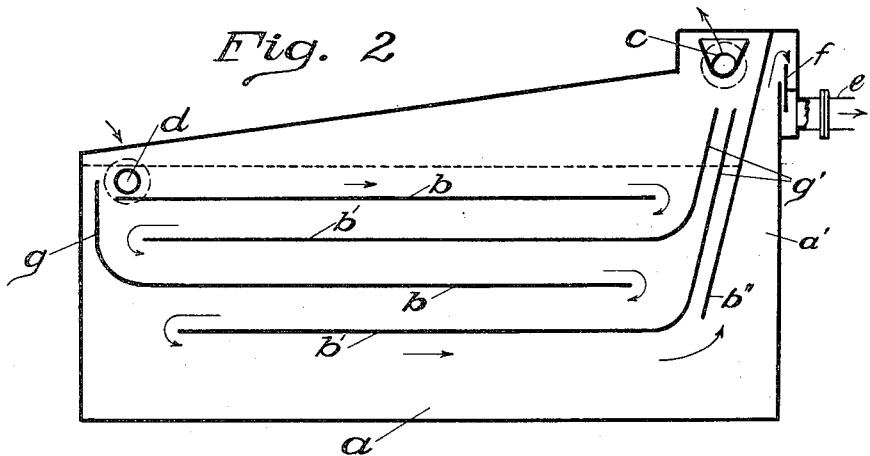
INVENTOR
Carl A. Schumacher
BY
ATTORNEY Patented Aug. 24, 1937

2,090,813

UNITED STATES PATENT OFFICE 2,090,813

APPARATUS FOR THE SEPARATION OF MIXTURES OF LIQUIDS OF DIFFERENT SPECIFIC GRAVITY

Carl August Schumacher, Leuna, Germany, assignor to I. G. Farbenindustrie Aktiengesellschaft, Frankfort-on-the-Main, Germany Application March 9, 1935, Serial No. 10,212
In Germany March 10, 1934

3 Claims. (Cl. 210—51)

The present invention relates to improvements in apparatus for the separation of mixtures of liquids of different specific gravity.

The separation of mixed liquids having different specific gravity, as for example of mixtures of oil and water, is generally speaking effected by causing the mixture to travel a sufficiently long distance at the lowest possible speed. For example two or more chambers may be arranged one behind another and the mixture caused to flow slowly through. The liquid of lower specific gravity, as for example the oil, which separates at the top is then either run off by means of cocks or skimmed off, while the liquid of higher specific gravity, for example water, is run off continuously or periodically. In the usual separating containers or flasks, the mixture of liquids flows through the container or flask in a vertical or horizontal direction. The disadvantage of the vertical flowing, which is arranged alternately upwards and downwards for the purpose of increasing the distance, resides in the fact that the mixture during part of the time (namely when flowing downwards) opposes the rising of the lighter component. The disadvantage of the horizontal flowing in the containers hitherto usual resides in the fact that the mixture only travels the path provided by the horizontal extension of the container space. In this manner, however, a far-reaching separation can only be obtained by the employment of extraordinarily large containers of which the space remains for the greater part unused. In both cases the drops of the liquid of lower specific gravity which are forming and ascending have to travel a comparatively long distance before they are withdrawn from the direction of flow of the mixture.

I have now found that the said disadvantages can be avoided and an excellent utilization of the container space obtained by separating the mixture of liquids in an apparatus consisting of a container which is preferably constricted, for example in the form of a funnel, towards the outlet for the liquid of lower specific gravity and which is subdivided by horizontal surfaces (also referred to as partitions) so that the mixture entering at the inlet describes a long zig-zag path downwards during which the separation takes place. The said surfaces are alternately carried up at the sides so that at the points at which the mixture changes direction the liquid of lower specific gravity may ascend to the outlet arranged at the top while the liquid of higher specific gravity continues to flow downwards and finally passes into a space parted off from the main container and provided with an outlet. The liquid of lower specific gravity which has separated during the zig-zag flow and collected in a collecting chamber forms a thicker layer at the end of its path by reason of the constriction of the container and this allows a continuous withdrawal of the entirely separated component. The height of the junction between the layers of liquid may be adjusted by means of a regulatable weir at the outlet for the liquid of higher specific gravity.

The number of the horizontal surfaces usually employed depends upon the size of the container and the proportion of the amounts of the different liquid constituents of the initial mixture. With small containers through which are passed only small amounts of liquid and with initial mixtures of oil and water containing small amounts of water only a small number of horizontal surfaces is necessary. Two horizontal surfaces are sufficient in many practical cases.

By the said separating layer, the container is subdivided into a space for the lighter and a space for the heavier liquid; in this manner the separated lighter component withdrawn from the direction of flow does not come into contact again with the mixture. If the path for the specifically lighter liquid in the constricted container should not be sufficiently long, the said liquid may be passed upwards along a similar zig-zag way, established, for example, by suitably arranged plates, as the heavier liquid passes downwards. By suitable dimensioning of the container, a practically complete separation can be effected.

The nature of the invention will be further described with reference to the accompanying drawing which illustrates by way of example an apparatus according to this invention intended for the separation of mixtures of oil and water, but the invention is not restricted to the particular apparatus shown.

In this drawing Figure 1 represents in a diagrammatic manner a front view of the said apparatus while Figure 2 shows, likewise diagrammatically, a longitudinal vertical section therethrough.

In the said drawing, $a$ is a container which is constricted toward the oil outlet $c$. The mixture of oil and water is supplied to the container through the inlet $d$ and flows downwards through a long zig-zag path over the horizontal surfaces $b$ and $b'$. The surfaces are alternately carried up at the sides, $b$ at the left side and $b'$ at the right side. The devices representing the parts carried up of the surfaces are denoted in the drawing by *g* and *g'*. By these devices the stream of liquid flowing along the horizontal surfaces is forced to change its direction. The oil which has risen to the surface escapes at these places and ascends to the collecting space at the top and to the outlet *c*. The container is subdivided by a practically vertical separating wall *b''* to provide a collecting chamber *a'* for the water. The separating wall *b''* may also be formed by the lowermost carried-up surface *b'* and in this case the surface must be carried right up to the top. The water flows into the collecting chamber *a'*, rises therein and leaves through the outlet *e* free from oil. The height of the water outlet may be altered by means of an adjustable weir *f*. The position of the weir determines the height of the junction between the layers of oil and water; the junction is indicated by a dotted line.

In the separation of a mixture of oil and water consisting of about 3 parts of water and 1 part of oil (specific gravity of water at about 80° C. being 0.97 and of the oil at the same temperature being about 0.925 to 0.950) the following results are obtained:

With an oil chamber content of about 0.5 cubic meter and a water space content of 3 cubic meters, there remains about 1.5 per cent of water in the oil, while with an oil chamber content of 1 cubic meter and a water space content of 4 cubic meters the oil contains at the most traces of water. A content of slime in the mixture only influences the oil outlet when large amounts of slime are present. By "oil chamber" and "water space" are meant the volumes above and below the oil-water line respectively in the container. It is true that the liquid in the space below the said oil-water line still contains oil, but for the most part it consists of water, so that the said space may aptly be called water space.

With a water space of about 2 cubic meters and an oil chamber of about 0.5 cubic meter, the water contains up to 3 per cent of oil, while with a water space of about 4 cubic meters and an oil chamber of about 1 cubic meter the water only contains traces of oil. In this case the content of slime is noticeable even in small amounts.

What I claim is:—

1. Apparatus for the separation of mixtures of liquids having different specific gravity which comprises a container, an inlet for liquid below the upper end of the container, and at the upper end and at a horizontal distance from said inlet an outlet for liquid, a plurality of spaced horizontal partitions arranged one below the other in the container from shortly below the said inlet downwards, each partition arranged below the uppermost partition being connected with a baffle extending alternately from the one or other end of such partition to a place above the next higher partition and causing the liquid flowing along a horizontal partition to reverse its direction before flowing along the next lower partition; each of said baffles being so arranged as to leave a free passageway, other than that between the said partitions, with the upper end of the container, and a further partition being arranged so that in the said container a passageway is formed which at one end is connected with the space below the lowermost of the first mentioned partitions and at the other end of which a second outlet for liquid is provided.

2. Apparatus as claimed in claim 1 in which the container is constricted towards the upper end.

3. A process for the separation or mixtures of liquids having different specific gravity which comprises introducing this mixture into a body of liquid comprising the said liquids having different specific gravity near the line above which the said body contains mainly the specifically lighter liquid and passing the said mixture successively through a plurality of horizontally extended spaces one arranged below the other, allowing at each transition from the end of each of said spaces to the next lower space the lighter component of the said mixture which has separated out therefrom to pass in an upward direction separately from the stream of this mixture to a place above the uppermost of the said horizontally extended spaces and collecting the parts of the lighter component removed from the said mixture at each of the said transitions in the part of the said body of liquid which is above the line above which this body contains mainly the specifically lighter liquid.

CARL AUGUST SCHUMACHER.